(12) United States Patent
Hasegawa et al.

(10) Patent No.: US 7,888,870 B2
(45) Date of Patent: Feb. 15, 2011

(54) PLASMA DISPLAY PANEL, METHOD OF PRODUCING THE SAME, AND SEALING MEMBER

(75) Inventors: Shinya Hasegawa, Osaka (JP); Yoshiaki Kai, Osaka (JP); Kazuhiro Yokota, Hyogo (JP); Akinobu Miyazaki, Osaka (JP)

(73) Assignee: Panasonic Corporation, Osaka (JP)

( * ) Notice: Subject to any disclaimer, the term of this patent is extended or adjusted under 35 U.S.C. 154(b) by 1031 days.

(21) Appl. No.: 11/569,911

(22) PCT Filed: Dec. 9, 2005

(86) PCT No.: PCT/JP2005/022660

§ 371 (c)(1),
(2), (4) Date: Dec. 1, 2006

(87) PCT Pub. No.: WO2006/064733

PCT Pub. Date: Jun. 22, 2006

(65) Prior Publication Data

US 2009/0179567 A1     Jul. 16, 2009

(30) Foreign Application Priority Data

Dec. 16, 2004   (JP)   ................... 2004-364431

(51) Int. Cl.
*H01J 17/49*   (2006.01)
*C03C 3/062*   (2006.01)

(52) U.S. Cl. ........................... 313/586; 501/73
(58) Field of Classification Search .......... 313/582–586
See application file for complete search history.

(56) References Cited

U.S. PATENT DOCUMENTS

| | | | | |
|---|---|---|---|---|
| 3,975,176 A * | 8/1976 | Salisbury | ........................ | 65/38 |
| 4,273,585 A * | 6/1981 | Krohn et al. | ................... | 501/15 |
| 5,246,890 A * | 9/1993 | Aitken et al. | ................... | 501/15 |
| 6,113,450 A * | 9/2000 | Narayanan et al. | ............ | 445/25 |
| 6,218,005 B1 * | 4/2001 | Moh | .......................... | 428/343 |
| 6,236,159 B1 * | 5/2001 | Inoue et al. | .................. | 313/582 |
| 6,306,783 B1 * | 10/2001 | Yamanaka | .................... | 501/15 |
| 7,214,429 B2 * | 5/2007 | Kato et al. | ................... | 428/406 |
| 7,439,201 B2 * | 10/2008 | Drake et al. | ................... | 501/15 |
| 7,737,619 B2 * | 6/2010 | Kai et al. | ..................... | 313/495 |

(Continued)

FOREIGN PATENT DOCUMENTS

EP       582113  A1 *   2/1994

(Continued)

*Primary Examiner*—Peter Macchiarolo
(74) *Attorney, Agent, or Firm*—Hamre, Schumann, Mueller & Larson, P.C.

(57) ABSTRACT

A plasma display panel (PDP) and a method of producing the same are provided. In the PDP, airtightness of discharge space is maintained and the performance of the PDP does not deteriorate while a sealing part containing $P_2O_5$ and SnO is provided. The sealing member with which such PDP can be obtained also is provided. The PDP includes a pair of substrates that are disposed facing each other so that a discharge space is formed therebetween, and peripheries of the pair of substrates are sealed together, with a first sealing part. The first sealing part includes a glass composition containing $P_2O_5$ and SnO, and a refractory filler. The organic matter content in the first sealing part is less than 11 ppm.

38 Claims, 8 Drawing Sheets

U.S. PATENT DOCUMENTS

| | | | |
|---|---|---|---|
| 2003/0059600 A1* | 3/2003 | Gazo et al. | 428/328 |
| 2004/0071925 A1* | 4/2004 | Kato et al. | 428/69 |
| 2006/0116469 A1* | 6/2006 | Taneichi et al. | 524/589 |
| 2006/0150679 A1* | 7/2006 | Fujimoto et al. | 65/42 |
| 2008/0026320 A1* | 1/2008 | Lee et al. | 430/270.1 |
| 2008/0290314 A1* | 11/2008 | Lee et al. | 252/62.3 V |

FOREIGN PATENT DOCUMENTS

| | | |
|---|---|---|
| JP | 6-191885 | 7/1994 |
| JP | 2000-007375 | 1/2000 |
| JP | 2001-139344 | 5/2001 |
| JP | 2001-302279 | 10/2001 |
| JP | 2002-515392 | 5/2002 |
| JP | 2002-326838 | 11/2002 |
| JP | 2003-095680 | 4/2003 |
| JP | 2003-221260 | 8/2003 |
| JP | 2003-238199 | 8/2003 |
| WO | 99/59180 | 11/1999 |

* cited by examiner

PLASMA DISPLAY PANEL, METHOD OF PRODUCING THE SAME, AND SEALING MEMBER

TECHNICAL FIELD

The present invention relates to a plasma display panel and a method of producing the same. The present invention also relates to a sealing member that can be used for producing a plasma display panel.

BACKGROUND ART

Plasma display panels (PDPs) have been developed as display devices a size of which can be increased easily and which can provide higher definition and higher luminance. A PDP is a device in which phosphors emit light using ultraviolet rays generated through a gas discharge, and thereby images are displayed. In the PDP, a pair of substrates (a front panel and a back panel) are facing each other maintaining predetermined space therebetween, and voltage is applied to the space between the substrates (discharge space) to cause a gas discharge. In order to display a stable image, it is important to maintain airtightness of the discharge space filled with the gas (a discharge gas).

In the PDP, generally, the airtightness of the discharge space is maintained by the following configuration. The peripheries of the front panel and the back panel are sealed together, with a first sealing part. In consideration of the process of producing the PDP, a vent that is used for filling gas in the discharge space is provided in at least one of the front panel and the back panel, and a glass tube used for filling the gas is disposed in an opening portion of the vent. The glass tube and the opening portion are sealed together, with a second sealing part, and further, the glass tube itself is sealed. The peripheries as well as the glass tube and the substrate on which the glass tube has been disposed are sealed together, respectively, by disposing sealing members in predetermined positions and carrying out a predetermined treatment such as heating, for example.

Conventionally, a glass frit made of low-melting glass containing lead oxide has been used often as a sealing member. However, from the viewpoint of environmental protection, there is a need for replacing it with glass that is substantially free from a lead component. The glass compositions that are substantially free from a lead component and that can be used as sealing members are disclosed in JP2001-302279A, JP2001-139344A, JP2000-7375A, JP2002-326838A, and JP2003-238199A, for example. The glass compositions that are disclosed in these publications are used as sealing members in a form of paste in which the compositions are dispersed in a paste vehicle containing resin and/or an organic solvent or in a form of a shaped body (a pressed fit) that is formed using an organic binder.

Each of the glass compositions that are disclosed in the respective publications described above contains $P_2O_5$ and SnO as its components. Among them, SnO is susceptible to oxidation or reduction at the time of a sealing process, i.e. the valency of Sn may fluctuate. That is, SnO tends to be changed into $SnO_2$ by the oxidation and also changed into Sn by the reduction. When SnO is oxidized or reduced at the time of sealing, flowability of the glass composition has decreased. Depending on the extent of the flowability decrease, the airtightness of the discharge space formed in the PDP cannot be maintained. As a result, the performance of the PDP may deteriorate in some cases.

Accordingly, there is a demand for PDPs in which the airtightness of the discharge space is maintained and a performance of which does not deteriorate while the PDPs include a sealing part containing $P_2O_5$ and SnO. There also is a demand for the sealing members using which such PDPs can be obtained.

DISCLOSURE OF INVENTION

A first plasma display panel (PDP) of the present invention includes a pair of substrates that are disposed opposing each other so that a discharge space is formed therebetween. The peripheries of the pair of substrates are sealed together with a first sealing part. The first sealing part includes a glass composition containing $P_2O_5$ and SnO and a refractory filler. The organic matter content in the first sealing part is 10 ppm or less.

A second PDP of the present invention includes a pair of substrates that are disposed opposing each other so that a discharge space is formed therebetween. At least one substrate selected from the pair of substrates is provided with a vent. A tube member that is in communication with the vent is disposed on a principal plane located on the opposite side to the side of the discharge space of the at least one substrate. The at least one substrate and the tube member are sealed together with a second sealing part. The tube member is sealed. The second sealing part includes a glass composition containing $P_2O_5$ and SnO and a refractory filler. The organic matter content in the second sealing part is 10 ppm or less.

A first method of producing a PDP according to the present invention includes: disposing a pair of substrates and a first sealing member so that the first sealing member is held between the pair of substrates and a discharge space is formed between the pair of substrates; and sealing the peripheries of the pair of substrates together by heating the first sealing member. The first sealing member is a shaped body in which a glass composition containing $P_2O_5$ and SnO and a refractory filler are included and the organic matter content is less than 30 ppm.

A second method of producing a PDP according to the present invention includes: disposing a tube member on a principal plane located on the opposite side to the side of a discharge space of at least one substrate selected from a pair of substrates that form the discharge space therebetween so that the tube member is in communication with a vent provided for the at least one substrate; sealing the at least one substrate and the tube member together by disposing a second sealing member in the vicinity of the tube member and then heating the second sealing member; and sealing the tube member after filling the discharge space with a predetermined gaseous matter through the tube member and the vent. The second sealing member is a shaped body in which a glass composition containing $P_2O_5$ and SnO and a refractory filler are included, and the organic matter content is less than 30 ppm.

A third method of producing a PDP according to the present invention includes: disposing a pair of substrates and a first sealing member so that the first sealing member is held between the pair of substrates and a discharge space is formed between the pair of substrates; and sealing the peripheries of the pair of substrates together by heating the first sealing member. The first sealing member is a shaped body that includes a glass composition containing $P_2O_5$ and SnO, a refractory filler, and an inorganic binder having a softening point that is lower than that of the glass composition.

A fourth method of producing a PDP according to the present invention includes: disposing a tube member on a principal plane located on the opposite side to the side of a discharge space of at least one substrate selected from a pair of substrates that form the discharge space therebetween so that the tube member is in communication with a vent provided for the at least one substrate; sealing the at least one substrate and the tube member together by disposing a second sealing member in the vicinity of the tube member and then heating the second sealing member; and sealing the tube member after filling the discharge space with a predetermined gaseous matter through the tube member and the vent. The second sealing member is a shaped body that includes a glass composition containing $P_2O_5$ and SnO, a refractory filler, and an inorganic binder having a softening point that is lower than that of the glass composition.

A first sealing member of the present invention is a shaped body that includes a glass composition containing $P_2O_5$ and SnO and a refractory filler. In the shaped body, the organic matter content is less than 30 ppm.

A second sealing member of the present invention is a shaped body. The shaped body includes a glass composition containing $P_2O_5$ and SnO, a refractory filler, and an inorganic binder having a softening point that is lower than that of the glass composition.

A third sealing member of the present invention is a shaped body that is obtained by mixing a glass composition containing $P_2O_5$ and SnO, a refractory filler, and an inorganic binder having a softening point that is lower than that of the glass composition, and then shaping it at a temperature that is equal to or higher than the glass transition point of the inorganic binder but is lower than the softening point of the glass composition.

According to the present invention, by specifying the organic matter content in the sealing part, the following PDP and a method of producing it can be provided. That is, the PDP is provided with a sealing part containing $P_2O_5$ and SnO while allowing the airtightness to be maintained in the discharge space and preventing its performance from deteriorating. Furthermore, the present invention can provide a sealing member that allows such a PDP to be obtained.

DESCRIPTION OF THE INVENTION

Figure 1:
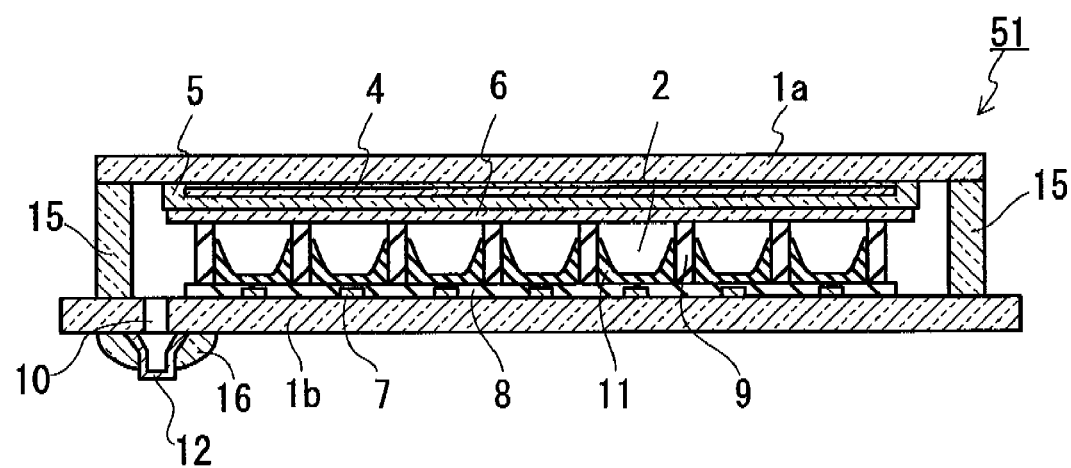
FIG. 1 is a cross-sectional view that schematically shows an example of the PDPs according to the present invention.

Embodiments of the present invention are described below with reference to the drawings. In the following descriptions, identical members may be indicated with identical numbers or characters and the same description may not be repeated, in some cases.

First, a sealing member of the present invention is described.

The sealing member of the present invention is a shaped body in which a glass composition containing $P_2O_5$ and SnO and a refractory filler are included and the organic matter content is less than 30 ppm (preferably 15 ppm or less, and more preferably free from the organic matter). Such a sealing member can prevent its flowability from deteriorating at the time of sealing and can improve sealing characteristics such as, for example, adhesiveness. Since the sealing member of the present invention is a shaped body, dimensional accuracy can be obtained more easily at the time of sealing as compared to the case of using a paste-like sealing member.

Conventionally, it has been known that a sealing member that includes a glass composition containing $P_2O_5$ and SnO makes it possible to obtain similar heat characteristics, for example, a lower softening point, to those of a sealing member that includes a glass composition containing a lead component, PbO. However, as described above, the mere inclusion of $P_2O_5$ and SnO in the glass composition may not prevent the flowability of the sealing member from deteriorating at the time of sealing due to the oxidation or reduction of SnO in some cases. On the contrary, in the sealing member of the present invention, the organic matter content in the shaped body is specified to less than 30 ppm. It is not clear why the flowability is prevented from deteriorating at the time of sealing by specifying the organic matter content. However, the organic matter that is contained in a certain amount or more may cause the following phenomenon. That is, carbon contained in the organic matter may be oxidized by the heat that is used at the time of sealing and thereby SnO is deprived of oxygen (i.e. Sn is reduced), or oxygen is added to SnO (i.e. Sn is oxidized) by water produced through the oxidization of the organic matter. For this reason, it is conceivable that when the organic matter content in the shaped body is limited to less than 30 ppm, SnO contained in the glass composition is prevented from undergoing a chemical change and thus the flowability can be prevented from deteriorating at the time of sealing. The sealing members that are disclosed in the respective publications described above in the Background Art each are a paste containing a glass composition dispersed in a vehicle containing resin and an organic solvent, or a shaped body that is obtained by mixing a glass composition and an organic binder and then shaping it. Hence, the organic matter content in each of these conventional sealing members is larger than 30 ppm that the present invention specifies. In the present specification, the unit "ppm" denotes parts per million by mass. The organic matter content may be evaluated using a technique such as gas chromatography mass spectrometry (GC-MS).

In the sealing member of the present invention, the composition of the glass composition contained in the shaped body is not particularly limited, as long as it contains $P_2O_5$ and SnO. It, however, is preferable that the glass composition contain at least 15 mol % SnO. In this case, the sealing member can maintain excellent heat characteristics (for instance, a lower softening point) while having improved water resistance.

Preferably, the glass composition contains 20 mol % to 60 mol % $P_2O_5$, 15 mol % to 60 mol % SnO, and 0.5 mol % to 10 mol % ZnO. $P_2O_5$ is a network-former of glass. Preferably, $P_2O_5$ is contained in an amount of at least 20 mol % as a component that forms the main skeleton. From the viewpoint of improving the water resistance, it is preferable that the content of $P_2O_5$ be 60 mol % or less. As described above, the content of SnO is preferably at least 15 mol % while being preferably 60 mol % or less from the viewpoint of improving the stability of the glass composition. ZnO has effects of helping form the glass composition and improving the water resistance. Preferably, the content thereof is 0.5 mol % to 10 mol %.

The glass composition may contain components other than the above-mentioned components. For instance, it may contain at least one selected from $B_2O_3$, $SiO_2$, and $Al_2O_3$. When the glass composition contains such a component, the heat characteristics thereof can be adjusted or the stability thereof can be improved. Preferred amounts of the respective components to be contained in the glass composition are as follows: $B_2O_3$: 0 mol % to 5 mol %, $SiO_2$: 0 mol % to 8 mol %, and $Al_2O_3$: 0 mol % to 5 mol %. An excessively large content of $B_2O_3$ may decrease the water resistance of the sealing member. An excessively large content of $SiO_2$ may increase the softening point of the glass composition to deteriorate the flowability at the time of sealing. An excessively large content of $Al_2O_3$ tends to cause crystallization of the glass composition and thereby may deteriorate the sealing characteristics.

The glass composition may contain $Li_2O$, $Na_2O$, $K_2O$, MgO, CaO, SrO, BaO, $V_2O_5$, $TeO_2$, CuO, $Bi_2O_3$, $TiO_2$, $MnO_2$, $ZrO_2$, $Nb_2O_5$, $MoO_3$, $WO_3$, rare earth oxide, etc., if needed. When the glass composition contains these components, its heat characteristics can be adjusted or its strength can be improved.

By adjusting the composition of the glass composition, the heat characteristics, for example, the softening point and the glass transition point, of the glass composition can be controlled. For instance, when the glass composition has the following composition: $P_2O_5$: 35 mol %, SnO: 56 mol %, ZnO: 6 mol %, $B_2O_3$: 1 mol %, and $Al_2O_3$: 2 mol %, a glass composition with a softening point of 350° C. is obtained. Furthermore, for example, when the glass composition has the following composition: $P_2O_5$: 53 mol %, SnO: 22 mol %, ZnO: 10 mol %, $SiO_2$: 7 mol %, $Nb_2O_5$: 6 mol %, and $La_2O_3$: 2 mol %, a glass composition with a softening point of 365° C. is obtained. The heat characteristics of the glass composition are reflected in the heat characteristics of the sealing member. Accordingly, by adjusting the composition of the glass composition, a sealing member can be obtained that is used suitably at a predetermined sealing temperature.

The refractory filler has an effect of controlling the thermal expansion coefficient of the sealing member. In the case of producing a PDP, it is preferable that the difference in thermal expansion coefficient between the substrate and the sealing member be as small as possible. By selecting the type and amount of the refractory filler to be contained in the shaped body, the thermal expansion coefficient of the sealing member can be controlled and thereby the difference in thermal expansion coefficient between the sealing member and the substrate can be reduced.

The type of the refractory filler is not particularly limited. For example, the refractory filler to be used herein can be at least one selected from the group consisting of cordierite, willemite, forsterite, anorthite, zircon, mullite, beta-eucryptite, beta-spodumene, cristobalite, barium titanate, aluminum titanate, titanium oxide, tin oxide, aluminum oxide, zirconium oxide, zirconium phosphate, silica glass, sialon, silicon nitride, silicon carbide, a beta-quartz solid solution, and a compound that is expressed by a formula of $AD_2(MO_4)_3$. In the aforementioned formula, A denotes at least one element selected from the group consisting of Li, Na, K, Mg, Ca, Sr, Ba, Zn, Cu, Ni, and Mn, D denotes at least one element selected from the group consisting of Zr, Ti, Sn, Nb, Al, Sc, and Y, and M denotes at least one element selected from the group consisting of P, Si, W, and Mo.

The amount of the refractory filler to be contained in the shaped body is not particularly limited. It is, for example, in the range of 0 wt % to 70 wt %, and preferably in the range of 5 wt % to 50 wt %. Specific examples of the shaped body include a shaped body containing 70 wt % of a glass composition and 30 wt % cordierite that is used as a refractory filler, and a shaped body containing 80 wt % of a glass composition and 20 wt % zirconium phosphate that is used as a refractory filler.

In the sealing member of the present invention, the shaped body further may include an inorganic binder having a softening point that is lower than that of the glass composition. This facilitates the shaping of the sealing member (shaped body) when it is produced. In addition, unlike the conventional shaped body containing an organic binder, the organic matter content in the shaped body can be reduced to a minimum. The sealing member of the present invention may contain an organic material such as an organic binder, as long as the organic matter content in the shaped body is less than 30 ppm.

The inorganic binder is not particularly limited. The inorganic binder to be used herein may be, for example, amorphous glass, crystallized glass that is crystallized after shaping, inorganic oxide, etc., or may be water glass containing sodium silicate as its main component. Such an inorganic binder has a significant effect of binding the glass composition and the refractory filler to each other and thereby maintaining the shape of the shaped body.

Preferably, the inorganic binder contains at least one element selected from the group consisting of B, Bi, Zn, P, Sn, Te, V, and Cu. Such an element may be contained as an oxide, for example. Specific examples thereof include $B_2O_3$—$Bi_2O_3$ glass, $P_2O_5$ glass, $P_2O_5$—SnO glass, $TeO_2$ glass, $V_2O_5$ glass, etc. More specifically, the following glasses can be used, for example: a glass (with a softening point of 352° C.) containing 15 mol % $B_2O_3$, 70 mol % $Bi_2O_3$, and 15 mol %

$SiO_2$; a glass (with a softening point of 321° C.) containing 80 mol % $Bi_2O_3$, and 20 mol % $SiO_2$; a glass (with a softening point of 213° C.) containing 40 mol % $P_2O_5$, and 60 mol % SnO; a glass (with a softening point of 330° C.) containing 36 mol % $P_2O_5$, 50 mol % $Na_2O$, and 14 mol % BaO; a glass (with a softening point of 300° C.) containing 33 mol % $P_2O_5$, 61% $Na_2O$, and 6 mol % BaO; a glass (with a softening point of 350° C.) containing 29 mol % $P_2O_5$, 19 mol % $TeO_2$, and 52 mol % $V_2O_5$; and a glass (with a softening point of 312° C.) containing 70 mol % $TeO_2$, 25 mol % $Li_2O$, and 5 mol % $TiO_2$.

The composition of the inorganic binder may be identical to that of the glass composition. In this case, when the shaped body is produced, the average particle diameter of the inorganic binder is allowed to be smaller than that of the glass composition, so that the shaping of the sealing member (shaped body) further is facilitated.

The amount of the inorganic binder to be contained in the shaped body is not particularly limited. It is, for example, in the range of 0.5 wt % to 50 wt %, and is preferably in the range of 2 wt % to 30 wt %.

When the shaped body contains an inorganic binder, it also can be said that the sealing member of the present invention is a shaped body that includes a glass composition containing $P_2O_5$ and SnO, a refractory filler, and an inorganic binder having a softening point that is lower than that of the glass composition. Similarly in such a sealing member, the similar effects to those described above can be obtained.

The shape of the sealing member of the present invention is not particularly limited. It can be a wedge shape, a rectangular solid shape, a ring shape, or a disk shape, for example.

At least one selected from a convex portion and a concave portion may be formed in the shaped body (a surface of the shaped body). Although the detail will be described later in the description of the method of producing a PDP according to the present invention, for example, the sealing can be carried out with higher adhesiveness and dimensional accuracy by disposing a sealing member A having a convex portion formed therein and a sealing member B having a concave portion that is formed therein and that fits with the aforementioned convex portion, with the convex portion and the concave portion fitting with each other. The shapes of the convex portion and the concave portion are not particularly limited.

The sealing member of the present invention can be obtained by the following production method, for example.

First, a glass composition is formed. The glass composition can be formed, for example, by mixing raw materials selected according to the composition that the glass composition requires, heating and melting it, and then cooling it. The glass composition thus formed can be crushed with, for instance, a ball mill into powder having a predetermined average particle diameter. In this case, it is preferable that the glass composition be crushed so that the ratio of the powder having a particle diameter of at least 150 μm is 20% or lower in terms of the frequency of particle size distribution. This allows the shapability of the shaped body to further improve. When heating is not carried out during the shaping of the shaped body, it is preferable that the glass composition be crushed so that the average particle diameter thereof is 10 μm or smaller.

Next, refractory filler powder is mixed into the glass composition powder thus formed. Preferably, the refractory filler to be mixed has an average particle diameter of 10 μm or smaller. It also is preferable that the ratio of the refractory filler having a particle diameter of at least 150 μm is 20% or lower in terms of the frequency of particle size distribution. In this case, the shapability of the shaped body further can be improved.

Particularly high shapability can be obtained in the cases where the average particle diameter of the glass composition and the refractory filler is in the range of 5 μm to 6 μm and the ratio of powder having a particle diameter of at least 150 μm including the glass composition and the refractory filler is 5% or lower, or where the average particle diameter of the glass composition and the refractory filler is in the range of 6 μm to 8 μm and the ratio of powder having a particle diameter of at least 150 μm including the glass composition and the refractory filler is 10% or lower.

Next, a predetermined shaping form is filled with the mixture of the glass composition and the refractory filler. It then is shaped under pressure. Thus a shaped body can be obtained. It can be heated while being shaped under pressure. Heating allows the shapability of the shaped body to improve further. The heating temperature is not particularly limited as long as it is lower than the softening point of the glass composition, for example. The shaped body thus obtained may be used as a sealing member without further processing or further may be provided with a member that is added for obtaining improved workability at the time of sealing.

Before shaping is carried out under pressure, an inorganic binder having a softening point that is lower than that of the glass composition further may be added to the mixture of the glass composition and the refractory filler, if necessary. The addition of the inorganic binder allows the shapability of the shaped body to improve further. Shaping can be carried out under pressure, while the inorganic binder is softened by heating. In this case, the glass composition and the refractory filler can be bound together better. The heating temperature is preferably equal to or higher than the glass transition point of the inorganic binder, and more preferably equal to or higher than the softening point thereof. However, it is preferable that the heating temperature be lower than the softening point of the glass composition. Conceivably, the sealing member thus obtained has a structure in which a domain containing a high proportion of glass composition and refractory filler is formed in a base material (matrix) containing a high proportion of inorganic binder.

When the inorganic binder further is added and the mixture is shaped under pressure while being heated, it also can be said that the sealing member obtained thereby is a sealing member that is a shaped body obtained by mixing a glass composition containing $P_2O_5$ and SnO, a refractory filler, and an inorganic binder having a softening point that is lower than that of the glass composition, and then shaping it at a temperature that is equal to or higher than the glass transition point of the inorganic binder but is lower than the softening point of the glass composition.

When the sealing member is to be produced, organic materials such as an organic binder may be added to the glass composition and the refractory filler, as long as the organic matter content in the shaped body to be obtained is less than 30 ppm.

Next, a PDP of the present invention is described.

FIG. 1 shows an example of the PDP according to the present invention. In a PDP 51 shown in FIG. 1, a pair of substrates 1a and 1b are disposed opposing each other so that a discharge space 2 is formed between the substrates 1a and 1b. The substrate 1b is provided with a vent 10. A tube member 12 that is in communication with the vent 10 is disposed on the principal plane located on the opposite side to the discharge space 2 of the substrate 1b. In the PDP 51, the peripheries of the substrates 1a and 1b are sealed together with a first sealing part 15. The substrate 1b and the tube member 12 are sealed together with a second sealing part 16. In addition, the end of the tube member 12 is sealed. Thus, the airtightness of the discharge space 2 is maintained. At least one sealing part selected from the first sealing part 15 and the second sealing part 16 includes a glass composition containing $P_2O_5$ and SnO and a refractory filler. The organic matter content in the at least one sealing part is 10 ppm or less (preferably 5 ppm or lower, and more preferably no organic matter is contained). With such a configuration, a PDP can be obtained that allows the airtightness of the discharge space 2 to be maintained and prevents its performance from deteriorating while being provided with a sealing part containing $P_2O_5$ and SnO.

It is preferable that each of the first sealing part 15 and the second sealing part 16 include a glass composition containing $P_2O_5$ and SnO and a refractory filler, and the organic matter content therein be 10 ppm or less. In this case, a PDP can be obtained that allows the airtightness of the discharge space 2 to be maintained further reliably and prevents the deterioration in its performance further more.

The configuration (for instance, the composition of the glass composition, the type of the refractory filler, and the type of the inorganic binder when it is contained) of the above-mentioned at least one sealing part may be the same as that of the sealing member according to the present invention described above. The aforementioned at least one sealing part can be formed by disposing the above-mentioned sealing member of the present invention in a predetermined position and then heating it to a predetermined temperature. When a sealing member containing an inorganic binder is used, it is conceivable that the sealing part formed as described above has a structure in which a domain containing a high proportion of glass composition and refractory filler is formed in a base material (matrix) containing a high proportion of inorganic binder.

In the PDP 51 shown in FIG. 1, an electrode group 4 including sustaining electrodes and scanning electrodes, a dielectric layer 5, and a protective layer 6 are disposed on the substrate 1a (a front panel) while data electrodes 7, a dielectric layer 8, and barrier ribs 9 are disposed on the substrate 1b (a back panel). The PDP 51 has a so-called "three-electrode structure". In FIG. 1, some of the barrier ribs and data electrodes to be included in an actual PDP are not shown.

The material to be used for the substrate 1a (the front panel) is not particularly limited, as long as it has translucency. For example, a glass substrate may be used. The material to be used for the substrate 1b (the back panel) also is not particularly limited. For example, a substrate containing glass and/or metal may be used. Usually, a glass substrate is used for each of the substrates 1a and 1b.

The material and configuration of the tube member 12 are not particularly limited. Preferably, however, the tube member 12 is formed of a glass tube since in that case, the tube member and the substrate 1b can be sealed together easily. The tube member 12 is sealed but the sealing position and sealing method are not particularly limited. For instance, the end located on the opposite side to the substrate 1b side of the tube member 12 can be sealed by being melted. The tube member 12 is disposed to cover the opening of the vent 10 located on the opposite side to the discharge space 2 side.

In the PDP 51 shown in FIG. 1, the vent 10 is formed in the substrate 1b. However, the vent 10 may be formed in the substrate 1a.

Figure 2:
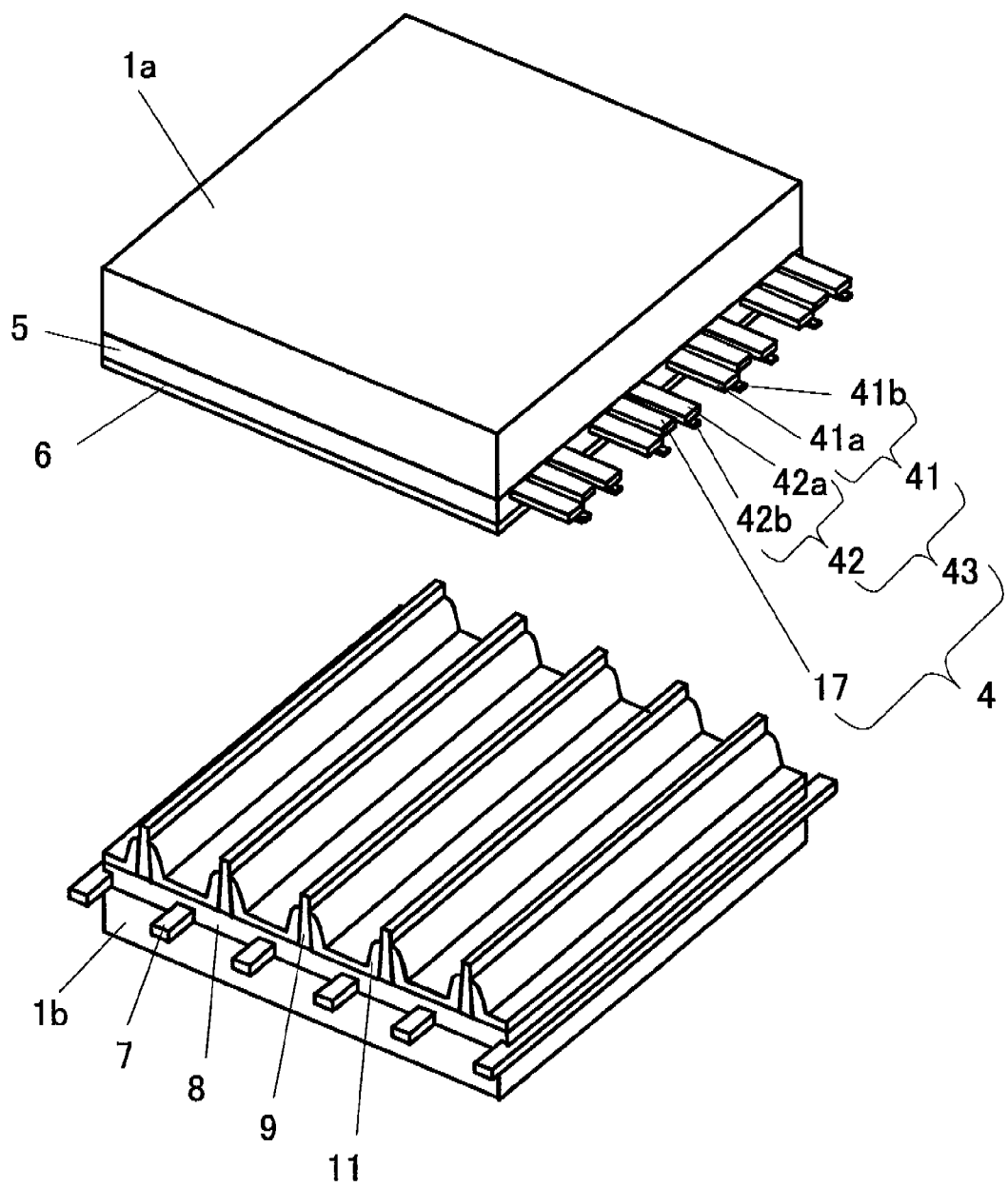
FIG. 2 is a schematic view that is used for explaining an example of the configuration of a PDP according to the present invention.

FIG. 2 shows a perspective view of the PDP 51 shown in FIG. 1, with the substrate 1a and the substrate 1b being separated. In FIG. 2, the sealing parts 15 and 16 are omitted and the substrates 1a and 1b are shown only partly.

As shown in FIG. 2, stripe-like scanning electrodes 41 and sustaining electrodes 42 are disposed in parallel to one another as an electrode group 4 on the substrate 1a. A display electrode 43 is formed of a scanning electrode 41 and a sustaining electrode 42. The scanning electrode 41 has a structure formed of a transparent electrode (scanning electrode) 41a and a bus electrode (scanning electrode) 41b that are stacked together while the sustaining electrode 42 has a structure formed of a transparent electrode (sustaining electrode) 42a and a bus electrode (sustaining electrode) 42b that are stacked together. ITO (indium tin oxide), tin oxide, etc. can be used for the transparent electrodes 41a and 42a. Aluminum, copper, silver, etc. can be used for the bus electrodes 41b and 42b. A black film 17 that is called a "black stripe" is disposed between the scanning electrode 41 and the sustaining electrode 42. The black film 17 is formed of glass and black pigments and is used for improving the quality of black display and increasing the contrast of images. The respective electrodes and black films 17 that are included in the electrode group 4 can be formed on the substrate 1a by a technique such as screen printing, for example.

Furthermore, the dielectric layer 5 is disposed so as to cover the display electrodes 43, on the substrate 1a. The protective layer 6 for protecting the dielectric layer 5 is disposed on the dielectric layer 5 (on the discharge space 2 side of the dielectric layer 5). The dielectric layer 5 serves as a capacitor that accumulates electric charges when the PDP 51 displays images. A material that generally is used for a PDP can be used for the dielectric layer 5. For example, the dielectric layer 5 can be a layer formed of low-melting glass. The dielectric layer 5 can be formed by applying a dielectric paste obtained by kneading low-melting glass, resin, and a solvent, onto the substrate 1a by a technique such as printing or transfer, and then drying and baking it. Similarly, a material that generally is used for a PDP can be used for the protective layer 6. For example, the protective layer 6 can be a layer formed of MgO.

The dielectric layer 8, the barrier ribs 9, and the stripe-like data electrodes 7 are disposed on the substrate 1b. The dielectric layer 8 is disposed so as to cover the data electrodes 7. The barrier ribs 9 are arranged so as to be in parallel to one another. A phosphor layer 11 is disposed between adjacent barrier ribs 9. The discharge space 2 is divided into pixels by the barrier ribs 9. The phosphor layer 11 contains phosphors that emit red, green, or blue light. The configuration of the data electrodes 7 can be the same as that of the bus electrodes. The dielectric layer 8 can be the same as the dielectric layer 5. The barrier ribs 9 can be formed using glass, pigments, etc.

The substrates 1a and 1b are disposed opposing each other so that the protective layer 6 and the barrier ribs 9 face the discharge space 2, and so that the stripe-like electrode group 4 and the data electrodes 7 are orthogonal to each other while being viewed from the principal planes of the substrates 1a and 1b. The discharge space 2 is filled with a discharge gas containing rare gas such as neon, xenon, etc. The pressure of the discharge gas contained in the discharge space 2 is, for example, in the range of 0.53 atm to 0.79 atm (400 Torr to 600 Torr).

In the PDP 51, an image signal voltage is applied selectively to the display electrodes 43 to excite the phosphors contained in the phosphor layer 11 and thereby the phosphors thus excited emit red, green, or blue light. Thus a color image can be displayed.

Except for the at least one sealing part, the structure and configuration of the PDP according to the present invention are not particularly limited and therefore any structure and configuration can be employed for the PDP. For instance, the substrates 1a and 1b are not limited to those of the example shown in FIG. 1 but can have a structure and configuration that generally are used for PDPs.

Furthermore, for example, when the first sealing part is the aforementioned at least one sealing part, the substrate 1b and the tube member 12 are sealed together with the second sealing part 16 and the tube member 12 can be sealed to seal the vent 10 as shown in FIG. 1, or a different configuration from that shown in FIG. 1 (for example, without the tube member 12) may allow the vent to be sealed.

Next, a method of producing a PDP according to the present invention is described.

The method of producing a PDP according to the present invention employs the above-mentioned sealing member of the present invention as a sealing member. Accordingly, a PDP can be produced in which the airtightness of the discharge space is maintained and its performance is prevented from deteriorating while a sealing part containing $P_2O_5$ and SnO is provided.

An example of the production method according to the present invention is shown in FIGS. 3A to 3F.

Figure 3A:
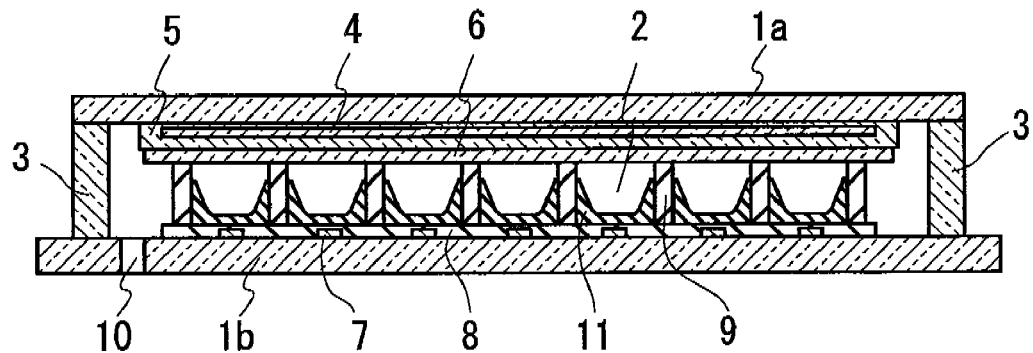
FIG. 3A is a cross-sectional view that schematically shows an example of the methods of producing a PDP according to the present invention.

First, as shown in FIG. 3A, a first sealing member 3 is disposed at the periphery of at least one substrate selected from a pair of substrates 1a and 1b. The substrates 1a and 1b are disposed opposing each other so that the first sealing member 3 is held between both the substrates and a discharge space 2 is formed between both the substrates. The substrate 1a (front panel) is provided with a dielectric layer 5, a protective layer 6, and a stripe-like electrode group 4 including sustaining electrodes and scanning electrodes. The substrate 1b (back panel) is provided with a dielectric layer 8, barrier ribs 9, a vent 10 that allows the discharge space 2 and the outside to be in communication with each other, and stripe-like data electrodes 7. A phosphor layer 11 is formed between adjacent barrier ribs 9. The substrates 1a and 1b are disposed opposing each other so that the protective layer 6 and barrier ribs 9 face each other and the electrode group 4 and the data electrodes 7 are orthogonal to each other when being viewed from the principal planes of the substrates 1a and 1b. The structure and configuration of the substrates 1a and 1b to be disposed are not limited to those of the example shown in FIG. 3A, as long as they can be used for a PDP.

Figure 3B:
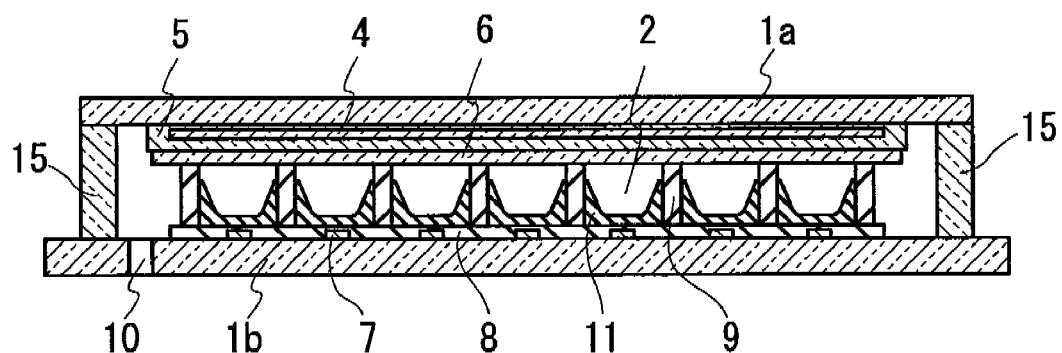
FIG. 3B is a cross-sectional view that schematically shows an example of the methods of producing a PDP according to the present invention.

Next, as shown in FIG. 3B, the peripheries of the substrates 1a and 1b are sealed together by heating the first sealing member 3. The first sealing member 3 is softened or melted by heating. Then it serves as a first sealing part 15 after the temperature thereof decreases. The method of heating the first sealing member 3 is not particularly limited. For example, the whole including the substrates 1a and 1b can be placed in a heating furnace that is maintained at a predetermined temperature. The heating temperature is not limited as long as it is equal to or higher than the glass transition point, preferably the softening point of the sealing member 3. However, the heating temperature must be a temperature that does not cause any deterioration of the functions of the respective members formed on the substrates 1a and 1b, such as the protective layer 6, barrier ribs 9, etc., and the functions of the substrates 1a and 1b themselves. In order to prevent the phosphor layer 11 from deteriorating, it is preferable that the sealing be carried out in a dry atmosphere and/or a reduced-pressure atmosphere.

Figure 3C:
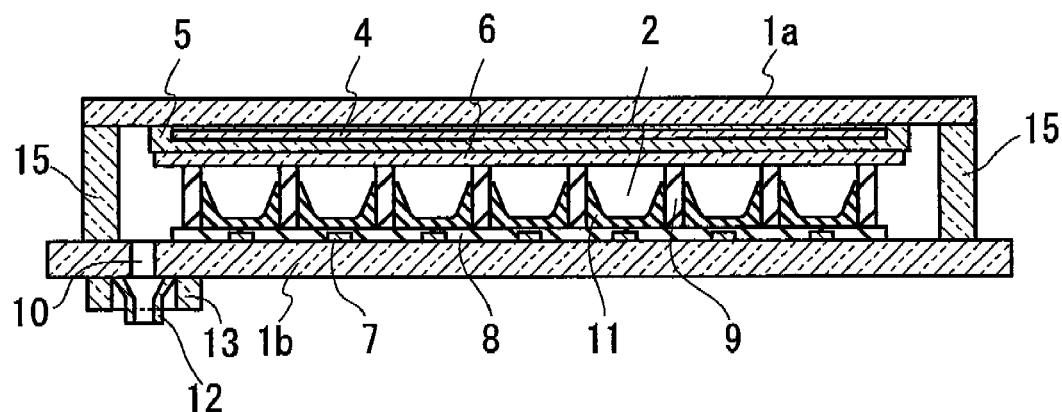
FIG. 3C is a cross-sectional view that schematically shows an example of the methods of producing a PDP according to the present invention.

Next, as shown in FIG. 3C, a tube member 12 is disposed on the principal plane located on the opposite side to the discharge space 12 of the substrate 1b so as to be in communication with the vent 10 provided for the substrate 1b. A second sealing member 13 is placed in the vicinity of the tube member 12.

Figure 3D:
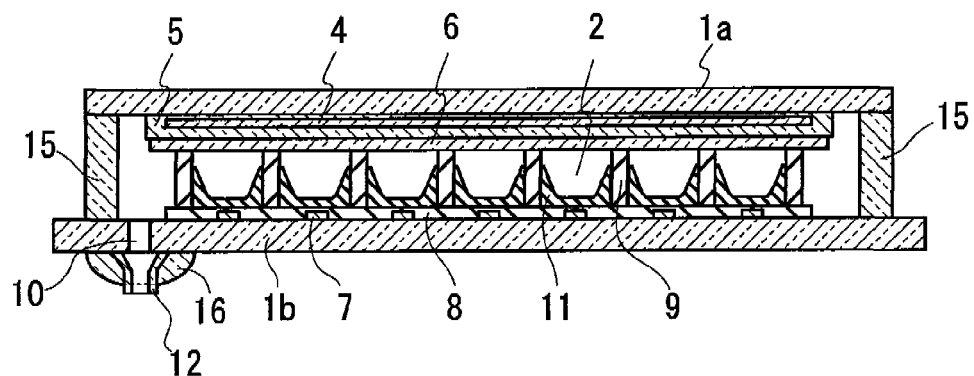
FIG. 3D is a cross-sectional view that schematically shows an example of the methods of producing a PDP according to the present invention.

Subsequently, as shown in FIG. 3D, the substrate 1b and the tube member 12 are sealed together by heating the second sealing member 13. The second sealing member 13 is softened or melted by heating. Then it serves as a second sealing part 16 after the temperature thereof decreases. The method of heating the second sealing member 13 can be the same as that used for heating the first sealing member 3.

Figure 3E:
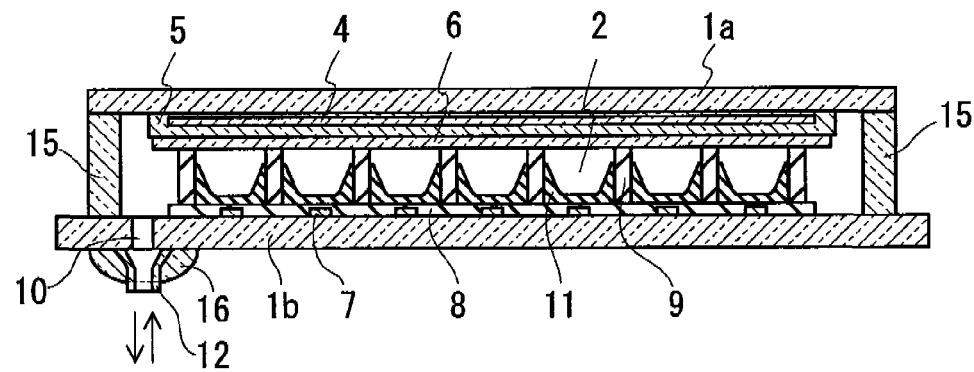
FIG. 3E is a cross-sectional view that schematically shows an example of the methods of producing a PDP according to the present invention.

Next, as shown in FIG. 3E, the air contained in the discharge space 2 is exhausted and the discharge space 2 is filled with a discharge gas through the vent 10 and the tube member 12 that have been sealed together with the substrate 1b by the second sealing part 16. The method of exhausting the air from the discharge space 2 and the method of filling the discharge space 2 with a discharge gas are not particularly limited. Any methods can be used that generally are employed for producing PDPs. The filling can be carried out so that the pressure of the discharge gas in the discharge space 2 is, for example, in the range of 0.53 atm to 0.79 atm (400 Torr to 600 Torr).

Figure 3F:
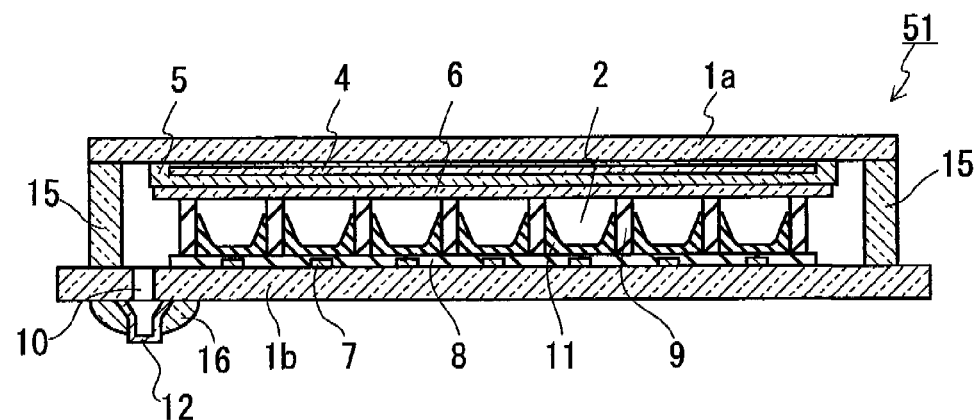
FIG. 3F is a cross-sectional view that schematically shows an example of the methods of producing a PDP according to the present invention.

Then, as shown in FIG. 3F, the tube member 12 is sealed and thereby the airtightness of the discharge space 2 is maintained. Thus, the PDP 51 can be obtained. The method of sealing the tube member 12 is not particularly limited, as long as the airtightness of the discharge space 2 can be maintained by sealing the tube member 12. For instance, when the tube member 12 is a glass tube, an end (the end located on the opposite side to the substrate 1b side) of the tube member 12 is heated and thereby is melted to be sealed.

In the production method of the present invention, the aforementioned sealing member of the present invention can be used for at least one sealing member selected from the first sealing member 3 and the second sealing member 13. Particularly, it is preferable that it be used for both the sealing members 3 and 13.

Sealing the substrate 1a and the substrate 1b together and sealing the substrate 1b and the tube member 12 together can be carried out at the same time.

Figure 4:
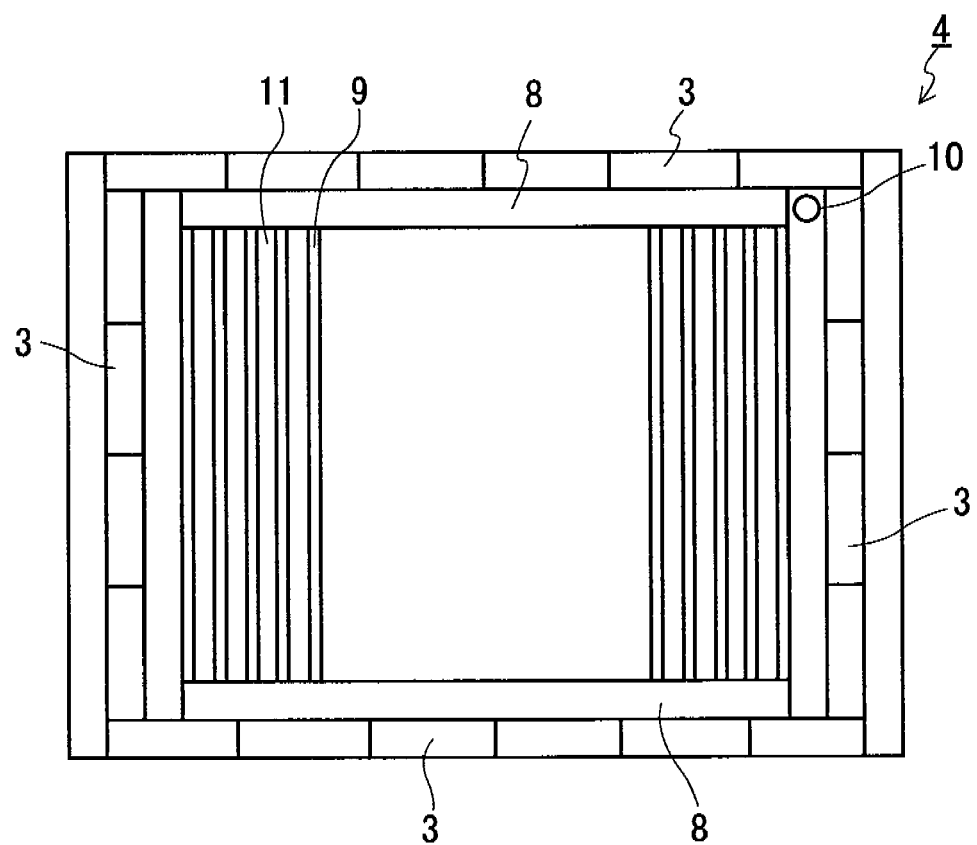
FIG. 4 is a schematic view showing an example of the method of disposing sealing members in a method of producing a PDP according to the present invention.

The method of disposing the first sealing member 3 at the peripheries of the substrate 1a and/or the substrate 1b is not particularly limited, as long as the airtightness can be maintained in the first sealing part 15 to be formed. For example, as shown in FIG. 4, at least two sealing members 3 may be disposed at the periphery of the substrate 1b so as to adjoin one another (it also can be said that the sealing members 3 shown in FIG. 4 are disposed annularly around the entire circumference of the periphery of the substrate 1b). In such a disposition method, the peripheries of the substrates 1a and 1b can be sealed together more reliably. In FIG. 4, in order to make the description easy to understand, the barrier ribs 9 and the phosphor layer 11 that are provided for the substrate 1b are shown only partly.

The first sealing members 3 may be disposed at the periphery of the substrate 1a (front panel) instead of the periphery of the substrate 1b (back panel) as shown in FIG. 4. The first sealing members 3 may be disposed at the peripheries of both the substrates.

Figure 5:
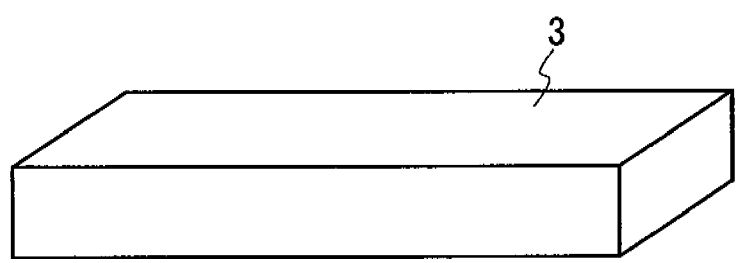
FIG. 5 is a schematic view showing an example of the sealing member that is used in a method of producing a PDP according to the present invention.

The shape of the first sealing members 3 is not particularly limited, as long as it allows the peripheries of the substrates 1a and 1b to be sealed together. For example, as shown in FIGS. 4 and 5, it can be a rectangular solid shape. At least two types of first sealing members 3 having different shapes from each other can be used together to be disposed at the peripheries of the substrate 1a and/or 1b.

Figure 6:
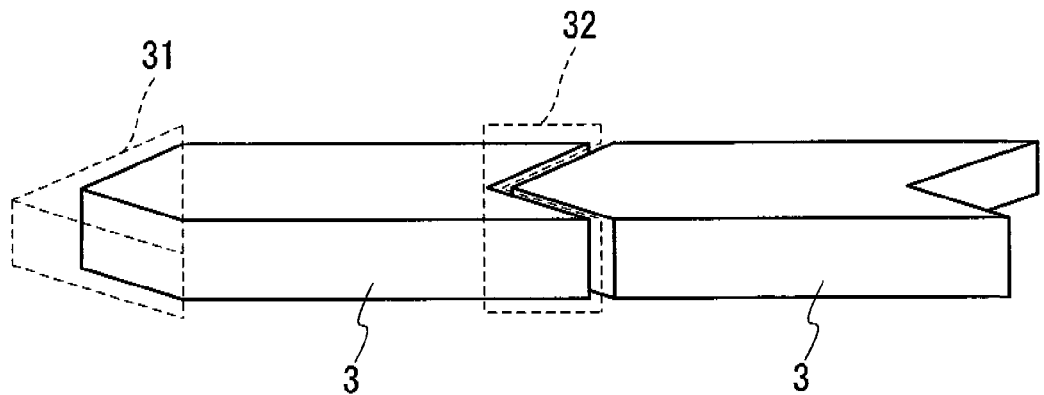
FIG. 6 is a schematic view showing another example of the sealing member that is used in a method of producing a PDP according to the present invention.

At least one selected from a convex portion and a concave portion may be formed in the first sealing member 3. The shape and number of the convex portion and/or the concave portion are not particularly limited. For instance, as shown in FIG. 6, a convex portion 31 and/or a concave portion 32 that have shapes that fit with each other may be formed. In the case of using such sealing members 3, when at least two sealing members are to be disposed adjoining each other, adjoining sealing members can be disposed with the convex portion 31 of one of them fitting with the concave portion 32 of the other. That is, in the production method of the present invention, a first sealing member A with a convex portion 31 formed therein and a first sealing member B with a concave portion 32 that is formed therein and that fits with the convex portion 31 of the first sealing member A, which are used as the first sealing members 3, can be disposed at the peripheries of the substrate 1a and/or 1b with the convex portion 31 of the sealing member A and the concave portion 32 of the sealing member B fitting with each other. Thereafter, the sealing member A and the sealing member B thus disposed are heated and thereby the peripheries of the substrates 1a and 1b can be sealed together. This method facilitates the positioning of the sealing members that are to be disposed at the periphery (particularly at corners of the periphery). In addition, sealing can be carried out with higher adhesiveness and dimensional accuracy. The shapes of the convex portion 31 and the concave portion 32 are not particularly limited, as long as the convex portion 31 and the concave portion 32 can fit with each other. In the example shown in FIG. 6, the convex portion 31 and the concave portion 32 are formed in both the end portions of the first sealing member 3, respectively. However, the positions where the convex portion 31 and/or the concave portion 32 are/is formed are not particularly limited.

In the production method of the present invention, the first sealing members 3 may be disposed at the peripheries of the substrate 1a and/or 1b in such a manner as to form openings for allowing the discharge space 2 and the outside of the pair of substrates 1a and 1b to be in communication with each other. Thereafter, by heating the first sealing member 3 thus disposed, the above-mentioned openings are sealed and the peripheries of the substrate 1a and 1b can be sealed together. This method can prevent the phosphor layer 11 from undergoing heat deterioration that is caused when sealing the peripheries together.

When the phosphor layer 11 is heated, the phosphors contained in the phosphor layer 11 may be deteriorated by heat and thereby the emission intensity and emission chromaticity may decrease in some cases. Particularly, it has a greater effect on the phosphors that emit blue light. The heat deterioration of the phosphors tends to occur in an atmosphere containing a high percentage of organic matter or moisture. When the peripheries are sealed together, the organic matter or moisture that has been adsorbed at the inner side of the panel is desorbed by heat and thereby the amounts of the organic matter and moisture contained in the discharge space 2 increases, which may accelerate the heat deterioration. When the first sealing members 3 are disposed so that the above-mentioned openings are formed, the organic matter or moisture that is generated in the discharge space 2 can escape through the openings to the outside until the first sealing members 3 are softened or melted. Hence, the amounts of the organic matter and moisture that are contained in the discharge space 2 at the time of sealing can be reduced and thereby the heat deterioration of the phosphor layer 11 can be avoided. In addition to the use of the method of disposing the first sealing members 3, when the atmosphere inside the heating furnace where the peripheries are sealed together is a dry atmosphere and/or a reduced-pressure atmosphere, the heat deterioration of the phosphors further can be avoided.

Figure 7:
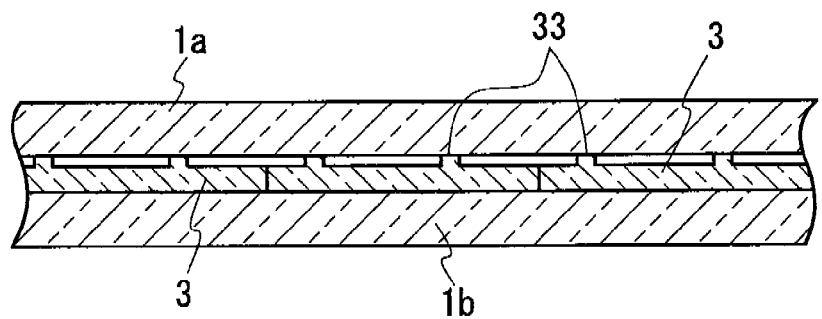
FIG. 7 is a cross-sectional view that schematically shows an example of the method of disposing sealing members in a method of producing a PDP according to the present invention.

In order to form the openings that allow the discharge space and the outside to be in communication with each other, as shown in FIG. 7, the first sealing members 3 with convex portions 33 formed on the surface thereof can be disposed so as to be in contact with the substrate 1a and/or 1b, for example. Until the first sealing members 3 are softened or melted, the openings that allow the discharge space 2 and the outside to be in communication with each other are provided by the convex portions 33. Thus the organic matter or moisture that is generated in the discharge space 2 is allowed to escape to the outside. In the example shown in FIG. 7, the first sealing members 3 are disposed so that the convex portions 33 are in contact with the periphery of the substrate 1a (front panel). However, the first sealing members 3 can be disposed so that the convex portions 33 are in contact with the periphery of the substrate 1b (back panel) or are in contact with the peripheries of both the substrates.

Figure 8:
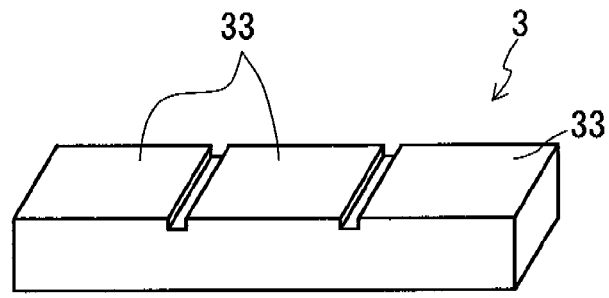
FIG. 8 is a schematic view showing still another example of the sealing member that is used in a method of producing a PDP according to the present invention.

The shape of the convex portions 33 is not particularly limited. The first sealing members 3 may have convex portions 33 formed as shown in FIG. 8. The first sealing members 3 may have convex portions 33 formed on its two surfaces that oppose each other.

Figure 9:
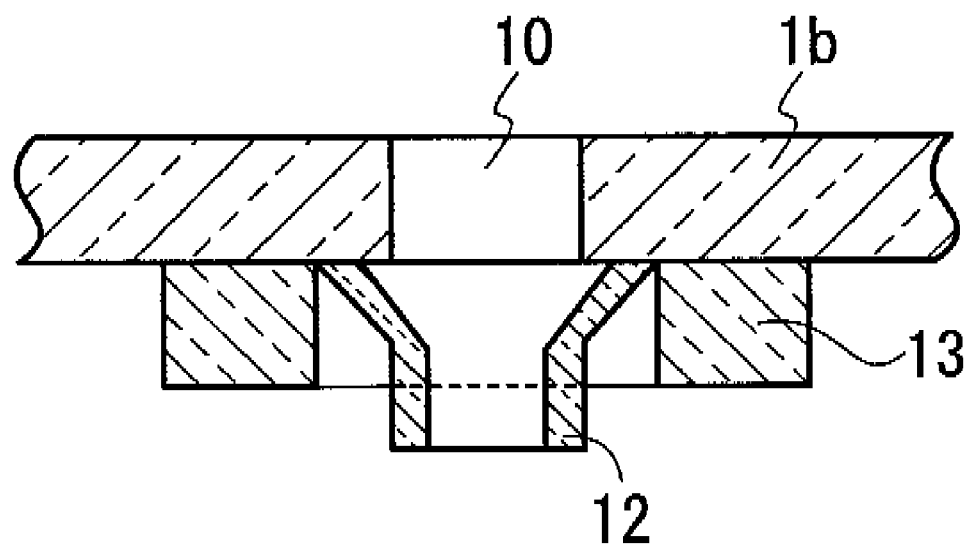
FIG. 9 is a cross-sectional view that schematically shows an example of the method of disposing a sealing member in a method of producing a PDP according to the present invention.

The method of disposing the second sealing member 13 in the vicinity of the tube member 12 is not particularly limited, as long as the airtightness can be maintained in the second sealing part 16 to be formed. For instance, as shown in FIGS. 3C and 9, a ring-like second sealing member 13 may be provided so as to be in contact with the substrate 1b around the tube member 12 disposed so as to be in communication with the vent 10. The shape of the second sealing member 13 is not particularly limited, as long as it allows the substrate 1b and the tube member 12 to be sealed together.

Figure 10:
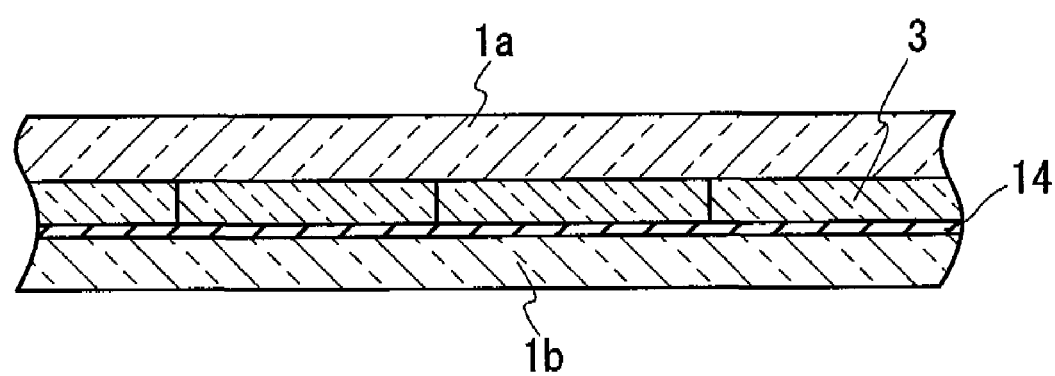
FIG. 10 is a cross-sectional view that schematically shows an example of the method of disposing sealing members in a method of producing a PDP according to the present invention.

In the production method of the present invention, as shown in FIG. 10, a paste 14 for temporarily bonding the first sealing members 3 may be applied to the periphery of at least one substrate selected from the substrates 1a and 1b, and then the first sealing members 3 may be positioned. This method further facilitates positioning of the first sealing members 3 and thereby sealing can be carried out with higher adhesiveness and dimensional accuracy. The paste 14 is not particularly limited but can be a paste containing, for example, low-melting glass, the above-mentioned inorganic binder, etc. Similarly in the case where the second sealing member 13 is to be disposed in the vicinity of the tube member 12, the second sealing member 13 may be provided after the paste 14 is applied to the substrate.

The method of producing a PDP according to the present invention is not limited to the example shown in FIGS. 3A to 3F, as long as at least one sealing member selected from the first sealing members 3 and the second sealing member 13 includes a refractory filler and a glass composition containing $P_2O_5$ and SnO, and the organic matter content in the at least one sealing member is less than 30 ppm. For instance, when the first sealing members 3 that seal the peripheries of the pair of substrates 1a and 1b together satisfy the above-mentioned conditions, the method of sealing the vent 10 is not limited to the method in which the tube member 12 is used, such as the one shown in FIGS. 3C to 3F.

EXAMPLES

The present invention is described below further in detail using examples. The present invention, however, is not limited to the following examples.

First, several types of samples of the sealing members formed of shaped bodies were produced. Then the organic matter content in each sealing member thus produced was evaluated. The methods of producing the respective sealing member samples are described below.

—Sample 1—

The raw materials, $NH_4H_2PO_4$, SnO, ZnO, $H_3BO_3$, and $Al(OH)_3$ each were weighed and then were mixed together so that the following composition was obtained: 35 mol % $P_2O_5$, 56 mol % SnO, 6 mol % ZnO, 1 mol % $B_2O_3$, and 2 mol % $Al_2O_3$. Thereafter, it was heated to be melted and then was cooled. Thus a glass composition having the above-mentioned composition was obtained.

Next, the glass composition thus obtained was crushed using a ball mill. Thus powder (with an average particle diameter of 6 µm) of the glass composition was obtained. The softening point of the glass composition was evaluated by differential thermal analysis (DTA) and was found to be 350° C. The softening points to be hereinafter described also were evaluated by the same method.

Subsequently, the powder of the glass composition produced as described above and cordierite powder that served as a refractory filler were mixed together so that the ratio of the refractory filler was 27 wt % of the whole, including an inorganic binder to be added later. The mixed powder had an average particle diameter of 6 µm. The ratio of powder having a particle diameter of 150 µm or larger was 5% of the whole.

Next, this mixture and glass powder (whose softening point was 312° C.) to serve as an inorganic binder were mixed together so that the ratio of the inorganic binder was 10 wt % of the whole. The glass powder had the following composition: 70 mol % $TeO_2$, 25 mol % $Li_2O$, and 5 mol % $TiO_2$. Thereafter, it was shaped at 330° C. under pressure. Thus rectangular solid and ring-like shaped bodies were obtained. The shaped bodies thus obtained were used as sealing members without further processing.

—Sample 2—

The raw materials, $NH_4H_2PO_4$, SnO, ZnO, $SiO_2$, $Nb_2O_5$, and $La_2O_3$ each were weighed and then were mixed together so that the following composition was obtained: 53 mol % $P_2O_5$, 22 mol % SnO, 10 mol % ZnO, 7 mol % $SiO_2$, 6 mol % $Nb_2O_5$, and 2 mol % $La_2O_3$. Thereafter, it was heated to be melted and then was cooled. Thus a glass composition having the above-mentioned composition was obtained.

Next, the glass composition thus obtained was crushed using a ball mill. Thus powder (with an average particle diameter of 7 µm) of the glass composition was obtained. The softening point of the glass composition was 365° C.

Subsequently, the powder of the glass composition produced as described above and zirconium phosphate powder that served as a refractory filler were mixed together so that the ratio of the refractory filler was 19 wt % of the whole including an inorganic binder to be added later. The mixed powder had an average particle diameter of 7 µm. The ratio of powder having a particle diameter of 150 µm or larger was 5% of the whole.

Next, this mixture and glass powder (whose softening point was 330° C.) to serve as an inorganic binder were mixed together so that the ratio of the inorganic binder was 7 wt % of the whole. The glass powder had the following composition: 36 mol % $P_2O_5$, 50 mol % $Na_2O$, and 14 mol % BaO. Thereafter, it was shaped at 350° C. under pressure. Thus rectangular solid and ring-like shaped bodies were obtained. The shaped bodies thus obtained were used as sealing members without further processing.

—Sample A (Comparative Example)—

Sample A, which is a comparative example, was produced in the same manner as in Sample 2. However, nitrocellulose to serve as an organic binder was added instead of the inorganic binder. The organic binder was added so as to be 1 wt % of the whole.

—Sample B (Comparative Example)—

Sample B, which is another comparative example, was produced in the same manner as in Sample 2. However, acrylic resin to serve as an organic binder was added instead of the inorganic binder. The organic binder was added so as to be 1 wt % of the whole.

—Sample C (Conventional Example)—

Sample C, which is a conventional example, was produced as follows.

The raw materials, $Pb_3O_4$, $H_3BO_3$, and $SiO_2$ each were weighed and then mixed together so that the following composition was obtained: 66 mol % PbO, 30 mol % $B_2O_3$, and 4 mol % $SiO_2$. Thereafter, it was heated to be melted and then was cooled. Thus a glass composition having the above-mentioned composition was obtained.

Next, the glass composition thus obtained was crushed using a ball mill. Thus powder (with an average particle diameter of 6 µm) of the glass composition was obtained. The softening point of the glass composition was 385° C.

Subsequently, the powder of the glass composition produced as described above and lead titanate powder that served as a refractory filler were mixed together so that the ratio of the refractory filler was 40 wt % of the whole including an organic binder to be added later. The mixed powder had an average particle diameter of 6 µm. The ratio of powder having a particle diameter of 150 µm or larger was 5% of the whole.

Next, this mixture and acrylic resin to serve as the organic binder were mixed together so that the ratio of the organic binder was 1 wt % of the whole. Thereafter, it was shaped at 350° C. under pressure. Thus rectangular solid and ring-like shaped bodies were obtained. The shaped bodies thus obtained were used as sealing members without further processing.

With respect to each sample prepared as described above, the gas that was generated when the sample was heated from room temperature to 400° C. was measured by gas chromatography mass spectrometry (GC-MS) and thereby the organic matter content therein was determined.

Next, using each type of samples, the PDP shown in FIG. 1 was produced by the method shown in FIGS. 3A to 3F. Rectangular solid shape samples were disposed at the periphery of a back panel (the substrate 1b) as the first sealing members 3 as shown in FIG. 4. Each ring-like shape sample was disposed as the second sealing member 13 so as to be in contact with the back panel (the substrate 1b) around a glass tube (the tube member 12) as shown in FIG. 9. The specific procedure for producing the PDP followed the method of producing a PDP of the present invention. However, sealing the peripheries of the front panel and the back panel together and sealing the glass tube and the back panel together were carried out at the same time. Each sealing temperature was 450° C. The discharge space was filled with a Xe—Ne gas to serve as a discharge gas in such a manner that the pressure thereof was 0.53 atm (400 Torr).

The organic matter content in the sealing parts of the PDP thus produced was determined by taking out the sealing parts from the PDP and then measuring the gas that was generated when the sealing parts were heated from room temperature to 400° C., by the gas chromatography mass spectrometry (GC-MS). The organic matter content in the first sealing part and that in the second sealing part were almost the same.

Next, each PDP produced as described above was subjected to the lighting test and thereby the luminance of the panel was evaluated. The lighting test and evaluation of the luminance of the panel were carried out using a luminance meter (a display color analyzer). Table 1 indicates the results of evaluations of the organic matter content in the sealing members, the organic matter content in the sealing parts, and the luminance of the panel. The luminance of the panel indicated in Table 1 is a relative value calculated with the luminance of a panel formed using Sample C being taken as 100%.

TABLE 1

|  | Sample | | | | |
| --- | --- | --- | --- | --- | --- |
|  | 1 | 2 | A (Comparative Example) | B (Comparative Example) | C (Conventional Example) |
| Organic Matter Content in Shaped Bodies (ppm) | 0 | 0 | 30 | 51 | 63 |
| Organic Matter Content in Sealing Parts (ppm) | 0 | 0 | 11 | 19 | 6 |
| Luminance of Panel (Relative Evaluation/%) | 104 | 103 | 77 | Not lighted | 100 |

As indicated in Table 1, in the cases of Samples A and B that were shaped using an organic binder and contained at least 30 ppm of organic matter (the organic matter contents in the sealing parts of the PDPs produced as described above were at least 11 ppm), the panels had deteriorated luminance as compared to the case of Sample C, which was a conventional example. Especially, in Sample B in which the organic matter content was 51 ppm (the organic matter content in the sealing parts of the PDP produced as described above was 19 ppm), the panel was not able even to be lighted. Conceivably, the increase in the organic matter content in the sealing members (shaped bodies) caused deterioration in flowability of the sealing members at the time of the sealing and thereby sufficiently high airtightness was not obtained in the sealing parts. On the other hand, in Samples 1 and 2, the luminance of the panels improved as compared to Sample C, which was a conventional example. Conceivably, by limiting the organic matter content in the sealing members (shaped bodies) to less than 30 ppm, the flowability of the sealing members was prevented from deteriorating at the time of sealing. Furthermore, it can be considered that the organic matter was inhibited from being introduced into the inner side of the panel, so that the phosphors were prevented from deteriorating and thereby the luminance of the panel was improved, as compared to Sample C, which was a conventional example.

The glass composition having the same composition as that of the glass composition used in Sample C was dispersed in a vehicle containing resin (nitrocellulose) and a solvent (isoamyl acetate). Thus a paste-like sealing member (Sample D: Conventional Example) was obtained. A PDP was produced using Sample D and then was subjected to the same lighting test. As a result, the luminance of the panel was almost the same as that obtained when a PDP was produced using Sample C. That is, in the cases of Samples 1 and 2, the panel of each PDP produced as described above had an improved luminance even when compared to Sample D. The PDP in which Sample D was used was produced according to a general method of manufacturing a PDP.

The present invention can be applied to other embodiments as long as they do not depart from the spirit and essential characteristics thereof. The embodiments disclosed in this specification are to be considered in all respects as illustrative and not limiting. The scope of the invention is indicated by the appended claims rather than by the foregoing description, and all changes which come within the meaning and range of equivalency of the claims are intended to be embraced therein.

INDUSTRIAL APPLICABILITY

According to the present invention, specifying the organic matter content in the sealing parts makes it possible to provide a PDP that allows the airtightness of the discharge space to be maintained and prevents its performance from deteriorating while being provided with a sealing part containing $P_2O_5$ and SnO, and a method of producing the same. According to the present invention, a sealing member that allows such a PDP to be obtained can be provided.

The sealing member of the present invention can be used not only for producing a PDP but also for producing a display panel (airtight-sealed display panel) in which a pair of substrates are disposed opposing each other and the airtightness of the space formed between the pair of substrates is maintained as in the case of the PDP, for example. When the sealing member of the present invention is used for producing the airtight-sealed display panel, a display panel can be provided that allows the airtightness of the space formed between the pair of substrates to be maintained and prevents its performance from deteriorating while being provided with a sealing part containing $P_2O_5$ and SnO as in the case of the PDP.

Such a display panel can be referred to as a display panel in which a pair of substrates are disposed opposing each other so that a space is formed between the pair of substrates, the peripheries of the pair of substrates are sealed together with a third sealing part, and thereby the airtightness of the space with respect to the outside is maintained, wherein the third sealing part includes a refractory filler and a glass composition containing $P_2O_5$ and SnO, and the organic matter content in the third sealing part is 10 ppm or less.

Furthermore, depending on the position where the sealing member of the present invention is disposed at the time of production, it also can be referred to as a display panel in which a pair of substrates are disposed opposing each other so that a space is formed between the pair of substrates, at least one substrate selected from the pair of substrates is provided with a vent, a tube member that is in communication with the vent is disposed on a principal plane located on the opposite side to the side of the space of the at least one substrate, the at least one substrate and the tube member are sealed together with a fourth sealing part, the tube member is sealed, and thus the airtightness of the space with respect to the outside is maintained, wherein the fourth sealing part includes a glass composition containing $P_2O_5$ and SnO and a refractory filler, and the organic matter content in the fourth sealing part is 10 ppm or less.

Examples of the airtight-sealed display panel include a field emission display panel (FED), a fluorescent display tube, a surface-conduction electron-emitter display (SED), etc. In these display panels including the PDP, since images with high definition and high luminance can be obtained and the size of the screen can be increased easily, further widespread use thereof is expected in the future.

The invention claimed is:

1. A plasma display panel comprising a pair of substrates that are disposed opposing each other so that a discharge space is formed therebetween, peripheries of the pair of substrates being sealed together, with a first sealing part,
wherein the first sealing part includes a glass composition containing $P_2O_5$ and SnO, and a refractory filler,
the glass composition further contains at least one selected from the group consisting of $B_2O_3$, $SiO_2$ and $Al_2O_3$, and
an organic matter content in the first sealing part is 0 ppm.

2. The plasma display panel according to claim 1, wherein the glass composition contains at least 15 mol % SnO.

3. The plasma display panel according to claim 1, wherein the glass composition contains: 20 mol % to 60 mol % $P_2O_5$, 15 mol % to 65 mol % SnO, and 0.5 mol % to 10 mol % ZnO.

4. The plasma display panel according to claim 1, wherein the refractory filler contains at least one selected from the group consisting of cordierite, willemite, forsterite, anorthite, zircon, mullite, beta-eucryptite, beta-spodumene, cristobalite, barium titanate, aluminum titanate, titanium oxide, tin oxide, aluminum oxide, zirconium oxide, zirconium phosphate, silica glass, sialon, silicon nitride, silicon carbide, a beta-quartz solid solution, and a compound that is expressed by a formula of $AD_2(MO_4)_3$, where in the formula, A denotes at least one element selected from the group consisting of Li, Na, K, Mg, Ca, Sr, Ba, Zn, Cu, Ni, and Mn, D denotes at least one element selected from the group consisting of Zr, Ti, Sn, Nb, Al, Sc, and Y, and M denotes at least one element selected from the group consisting of P, Si, W, and Mo.

5. The plasma display panel according to claim 1, wherein the first sealing part further includes an inorganic binder having a softening point that is lower than that of the glass composition.

6. The plasma display panel according to claim 5, wherein the inorganic binder contains at least one element selected from the group consisting of B, Bi, Zn, P, Sn, Te, V, and Cu.

7. The plasma display panel according to claim 1, wherein the glass composition contains $P_2O_5$ in an amount of 35 mol % to 53 mol %.

8. A plasma display panel comprising a pair of substrates that are disposed opposing each other so that a discharge space is formed therebetween,
at least one substrate selected from the pair of substrates being provided with a vent,
a tube member that is in communication with the vent being disposed on a principal plane located on an opposite side to a side of the discharge space of the at least one substrate,
the at least one substrate and the tube member being sealed together, with a second sealing part, and
the tube member being sealed,
wherein the second sealing part includes a glass composition containing $P_2O_5$ and SnO, and a refractory filler,
the glass composition further contains at least one selected from the group consisting of $B_2O_3$, $SiO_2$ and $Al_2O_3$, and
an organic matter content in the second sealing part is 0 ppm.

9. The plasma display panel according to claim 8, wherein the glass composition contains at least 15 mol % SnO.

10. The plasma display panel according to claim 8, wherein the glass composition contains: 20 mol % to 60 mol % $P_2O_5$, 15 mol % to 65 mol % SnO, and 0.5 mol % to 10 mol % ZnO.

11. The plasma display panel according to claim 8, wherein the refractory filler contains at least one selected from the group consisting of cordierite, willemite, forsterite, anorthite, zircon, mullite, beta-eucryptite, beta-spodumene, cristobalite, barium titanate, aluminum titanate, titanium oxide, tin oxide, aluminum oxide, zirconium oxide, zirconium phosphate, silica glass, sialon, silicon nitride, silicon carbide, a beta-quartz solid solution, and a compound that is expressed by a formula of $AD_2(MO_4)_3$ where in the formula, A denotes at least one element selected from the group consisting of Li, Na, K, Mg, Ca, Sr, Ba, Zn, Cu, Ni, and Mn, D denotes at least one element selected from the group consisting of Zr, Ti, Sn, Nb, Al, Sc, and Y, and M denotes at least one element selected from the group consisting of P, Si, W, and Mo.

12. The plasma display panel according to claim 8, wherein the second sealing part further includes an inorganic binder having a softening point that is lower than that of the glass composition.

13. The plasma display panel according to claim 12, wherein the inorganic binder contains at least one element selected from the group consisting of B, Bi, Zn, P, Sn, Te, V, and Cu.

14. The plasma display panel according to claim 8, wherein the glass composition contains $P_2O_5$ in an amount of 35 mol % to 53 mol %.

15. A method of producing a plasma display panel, the method comprising:
disposing a pair of substrates and a first sealing member so that the first sealing member is held between the pair of substrates and a discharge space is formed between the pair of substrates; and
sealing peripheries of the pair of substrates together by heating the first sealing member,
wherein the first sealing member is a shaped body in which a glass composition containing $P_2O_5$ and SnO, and a refractory filler are included, and an organic matter content is 0 ppm, and
the glass composition further contains at least one selected from the group consisting of $B_2O_3$, $SiO_2$ and $Al_2O_3$.

16. The method of producing a plasma display panel according to claim 15, wherein the glass composition contains at least 15 mol % SnO.

17. The method of producing a plasma display panel according to claim 15, wherein the glass composition contains: 20 mol % to 60 mol % $P_2O_5$, 15 mol % to 65 mol % SnO, and 0.5 mol % to 10 mol % ZnO.

18. The method of producing a plasma display panel according to claim 15, wherein the refractory filler contains at least one selected from the group consisting of cordierite, willemite, forsterite, anorthite, zircon, mullite, beta-eucryptite, beta-spodumene, cristobalite, barium titanate, aluminum titanate, titanium oxide, tin oxide, aluminum oxide, zirconium oxide, zirconium phosphate, silica glass, sialon, silicon nitride, silicon carbide, a beta-quartz solid solution, and a compound that is expressed by a formula of $AD_2(MO_4)_3$, where in the formula, A denotes at least one element selected from the group consisting of Li, Na, K, Mg, Ca, Sr, Ba, Zn, Cu, Ni, and Mn, D denotes at least one element selected from the group consisting of Zr, Ti, Sn, Nb, Al, Sc, and Y, and M denotes at least one element selected from the group consisting of P, Si, W, and Mo.

19. The method of producing a plasma display panel according to claim 15, wherein the shaped body further includes an inorganic binder having a softening point that is lower than that of the glass composition.

20. The method of producing a plasma display panel according to claim 19, wherein the inorganic binder contains at least one element selected from the group consisting of B, Bi, Zn, P, Sn, Te, V, and Cu.

21. The method of producing a plasma display panel according to claim 15, wherein a first sealing member A with a convex portion formed therein and a first sealing member B with a concave portion that is formed therein and that fits with the convex portion are disposed as the first sealing member, with the convex portion and the concave portion fitting with each other.

22. The method of producing a plasma display panel according to claim 15, wherein the first sealing member is disposed so that an opening is formed, with the opening allowing the discharge space to be in communication with the outside of the pair of substrates, and
the first sealing member is heated to seal the opening and the peripheries are sealed.

23. The method of producing a plasma display panel according to claim 22, wherein the first sealing member that is provided with a convex portion formed in its surface is disposed so that the convex portion is in contact with at least one substrate selected from the pair of substrates.

24. A method of producing a plasma display panel, the method comprising:
disposing a tube member on a principal plane located on an opposite side to a side of a discharge space of at least one substrate selected from a pair of substrates that form the discharge space therebetween so that the tube member is in communication with a vent provided for the at least one substrate;
sealing the at least one substrate and the tube member together by disposing a second sealing member in the vicinity of the tube member and then heating the second sealing member; and
sealing the tube member after filling the discharge space with a predetermined gaseous matter through the tube member and the vent,
wherein the second sealing member is a shaped body in which a glass composition containing $P_2O_5$ and SnO, and a refractory filler are included, and an organic matter content is 0 ppm, and
the glass composition further contains at least one selected from the group consisting of $B_2O_3$, $SiO_2$ and $Al_2O_3$.

25. The method of producing a plasma display panel according to claim 24, wherein the glass composition contains at least 15 mol % SnO.

26. The method of producing a plasma display panel according to claim 24, wherein the glass composition contains: 20 mol % to 60 mol % $P_2O_5$, 15 mol % to 65 mol % SnO, and 0.5 mol % to 10 mol % ZnO.

27. The method of producing a plasma display panel according to claim 24, wherein the refractory filler contains at least one selected from the group consisting of cordierite, willemite, forsterite, anorthite, zircon, mullite, beta-eucryptite, beta-spodumene, cristobalite, barium titanate, aluminum titanate, titanium oxide, tin oxide, aluminum oxide, zirconium oxide, zirconium phosphate, silica glass, sialon, silicon nitride, silicon carbide, a beta-quartz solid solution, and a compound that is expressed by a formula of $AD_2(MO_4)_3$, where in the formula, A denotes at least one element selected from the group consisting of Li, Na, K, Mg, Ca, Sr, Ba, Zn, Cu, Ni, and Mn, D denotes at least one element selected from the group consisting of Zr, Ti, Sn, Nb, Al, Sc, and Y, and M denotes at least one element selected from the group consisting of P, Si, W, and Mo.

28. The method of producing a plasma display panel according to claim 24, wherein the shaped body further includes an inorganic binder having a softening point that is lower than that of the glass composition.

29. The method of producing a plasma display panel according to claim 28, wherein the inorganic binder contains at least one element selected from the group consisting of B, Bi, Zn, P, Sn, Te, V, and Cu.

30. A method of producing a plasma display panel, the method comprising:
disposing a pair of substrates and a first sealing member so that the first sealing member is held between the pair of substrates and a discharge space is formed between the pair of substrates; and
sealing peripheries of the pair of substrates together by heating the first sealing member,
wherein the first sealing member is a shaped body that includes a glass composition containing $P_2O_5$ and SnO, a refractory filler, and an inorganic binder having a softening point that is lower than that of the glass composition,
the glass composition further contains at least one selected from the group consisting of $B_2O_3$, $SiO_2$ and $Al_2O_3$, and
an organic matter content in the first sealing member is 0 ppm.

31. A method of producing a plasma display panel, the method comprising:
disposing a tube member on a principal plane located on an opposite side to a side of a discharge space of at least one substrate selected from a pair of substrates that form the discharge space therebetween so that the tube member is in communication with a vent provided for the at least one substrate;
sealing the at least one substrate and the tube member together by disposing a second sealing member in the vicinity of the tube member and then heating the second sealing member; and
sealing the tube member after filling the discharge space with a predetermined gaseous matter through the tube member and the vent,
wherein the second sealing member is a shaped body that includes a glass composition containing $P_2O_5$ and SnO, a refractory filler, and an inorganic binder having a softening point that is lower than that of the glass composition,
the glass composition further contains at least one selected from the group consisting of $B_2O_3$, $SiO_2$ and $Al_2O_3$, and
an organic matter content in the second sealing member is 0 ppm.

32. A sealing member that is a shaped body in which a glass composition containing $P_2O_5$ and SnO, and a refractory filler are included, and an organic matter content is 0 ppm, and
the glass composition further contains at least one selected from the group consisting of $B_2O_3$, $SiO_2$ and $Al_2O_3$.

33. The sealing member according to claim 32, wherein the glass composition contains at least 15 mol % SnO.

34. The sealing member according to claim 32, wherein the glass composition contains: 20 mol % to 60 mol % $P_2O_5$, 15 mol % to 65 mol % SnO, and 0.5 mol % to 10 mol % ZnO.

35. The sealing member according to claim 32, wherein the refractory filler contains at least one selected from the group consisting of cordierite, willemite, forsterite, anorthite, zircon, mullite, beta-eucryptite, beta-spodumene, cristobalite, barium titanate, aluminum titanate, titanium oxide, tin oxide, aluminum oxide, zirconium oxide, zirconium phosphate, silica glass, sialon, silicon nitride, silicon carbide, a beta-quartz solid solution, and a compound that is expressed by a formula of $AD_2(MO_4)_3$, where in the formula, A denotes at least one element selected from the group consisting of Li, Na, K, Mg, Ca, Sr, Ba, Zn, Cu, Ni, and Mn, D denotes at least one element selected from the group consisting of Zr, Ti, Sn, Nb, Al, Sc, and Y, and M denotes at least one element selected from the group consisting of P, Si, W, and Mo.

36. The sealing member according to claim 32, wherein the shaped body further includes an inorganic binder having a softening point that is lower than that of the glass composition.

37. The sealing member according to claim 36, wherein the inorganic binder contains at least one element selected from the group consisting of B, Bi, Zn, P, Sn, Te, V, and Cu.

38. The sealing member according to claim 32, wherein the glass composition contains $P_2O_5$ in an amount of 35 mol % to 53 mol %.

* * * * *